Figure 1:
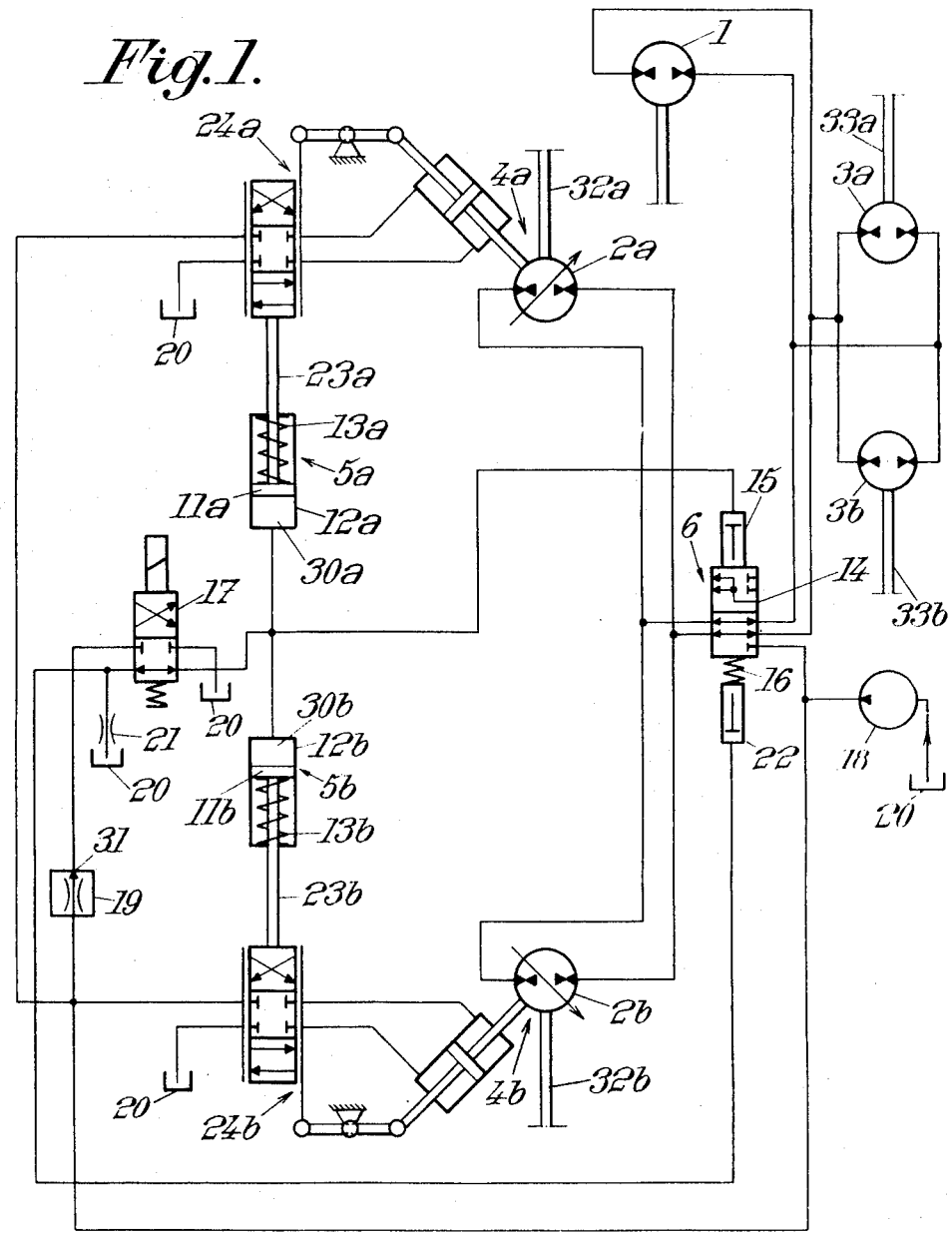

United States Patent

[11] 3,595,334

[72] Inventor Olivier Issac
 Lyon, France
[21] Appl. No. 858,654
[22] Filed Sept. 17, 1969
[45] Patented July 27, 1971
[73] Assignee Societe Industrielle Generale De Mecanique
 appliquee S.I.G.M.A.
 Paris, France
[32] Priority Sept. 20, 1968
[33] France
[31] 167,082

[54] HYDROSTATIC TRANSMISSION CONTROLS
 11 Claims, 2 Drawing Figs.
[52] U.S. Cl. .................................................... 180/66 R,
 60/53 R
[51] Int. Cl. ............................................... B60k 17/10
[50] Field of Search ............................................ 180/66,
 6.48, 6.3, 44 F, 44 M; 60/53, 53 A, 53 B, 53 C, 19

[56] References Cited
 UNITED STATES PATENTS
| | | | |
|---|---|---|---|
| 1,711,967 | 5/1929 | Robson ......................... | 60/53 (A) |
| 2,941,365 | 6/1960 | Carlson et al. ................. | 60/19 X |
| 2,942,421 | 6/1960 | Hann et al. .................... | 60/19 |
| 3,274,768 | 9/1966 | Klein ............................ | 60/19 |
| 3,292,723 | 12/1966 | Pinkerton et al. ............. | 180/66 R X |

FOREIGN PATENTS
| | | | |
|---|---|---|---|
| 1,197,751 | 6/1959 | France ......................... | 60/53 R |

Primary Examiner—Benjamin Hersh
Assistant Examiner—Milton L. Smith
Attorney—McClure, Weiser and Millmann ABSTRACT: A hydrostatic transmission of the kind useful in automotive vehicles is provided with dual speed-range control, such as is especially useful for heavy-duty vehicles used at low speed of travel on a working site but so that travel at relatively high speed is possible between such sites, and with smooth transition between speed ranges. Also provided is an antislip control to counteract automatically any overspeeding of the drive means for either traction wheel on a common axle.

HYDROSTATIC TRANSMISSION CONTROLS

This invention relates to controls for self-regulation of hydraulic transmissions. It concerns hydrostatic transmissions of the kind comprising an hydraulic generator or pump driven by a drive motor such as a heat engine or an electric motor, at least two receptors or hydraulic motors, adapted to be fed in parallel by the generator, interconnected mechanically to propulsion devices and at least one of which has associated with it a system adapted to vary the output or delivery per shaft revolution thereof to a null value. It concerns more particularly, but not exclusively, as likely to be the most advantageous application thereof, those that are installed in automotive vehicles for onsite working, the propulsion devices being especially traction wheels or groups thereof.

It is known, on the one hand, that when such vehicles travel on the work site they move at relatively slow speeds and that when they travel between working sites they move at relatively much higher speeds. It is desirable therefore, to provide such vehicles with at least a range of low speeds and a range of high speeds.

It is also known, on the other hand, that the working conditions of those vehicles are such that the traction wheels or groups thereof at opposite ends of each axle may rotate at different speeds, especially as a result of differences in gripping of the ground by the traction wheels, which can bring the vehicle to a halt by reason of slippage of the wheels.

A primary object of the present invention is to render the response of such hydrostatic transmissions under working conditions better than heretofore.

Another object of the invention is provision of such transmissions with at least two available ranges of speed when installed in automotive vehicles.

A further object is provision of means therein to eliminate slippage of the traction wheels.

Other objects of this invention, together with means and methods for attaining the various objects, will be apparent from the following description.

The present invention consists in the first place, insofar as the kind of hydrostatic transmissions in question is concerned, in providing means to cause a fluid to act at will under increasing or decreasing pressure, simultaneously upon a pressure-responsive device adapted to control the aforesaid system for adjusting the generator output and upon an interruption device adapted to isolate from the generator the first receptor with which that system is associated, the aforesaid pressure-sensitive control device and the interruption device being pressure-actuated differentially so that, as the fluid pressure increases, the pressure-sensitive control device at first reduces the first receptor's output progressively down to a null value, then the interruption device isolates that receptor, whereupon the second receptor is fed either by only part of the output of the generator (so long as the first receptor is fed in parallel) or by the entire output thereof (when the first receptor is isolated).

The invention comprises, aside from this principal feature, certain other features which are utilized preferably at the same time and which will be described more specifically below, especially a second feature wherein—at the same time as the systems for adjusting the output of the respective receptors of the transmissions of the kind concerned are associated therewith and as two traction wheels or groups thereof are driven thereby—the two receptors are mechanically interconnected, respectively, to two auxiliary pumps of identical output connected in series in a closed fluid circuit. Also there are provided, on the one hand, devices to bleed an excess of fluid from either of the b ranches of the closed circuit upon occurrence of excessive pressure therein and, on the other hand, for the respective receptors, corrective devices responsive to pressure and adapted to control, respectively, the aforesaid adjusting systems, the overall effect being such that when one of the pumps rotates more rapidly than the other the fluid thus subjected to excessive pressure in one of the branches acts upon the corrective control device for the more rapidly rotating receptor to reduce its output.

The invention will be readily understandable in any case, with the aid of the following description as well as the accompanying diagrams, relating to preferred embodiments given by way of example and not as limiting.

Figure 2:
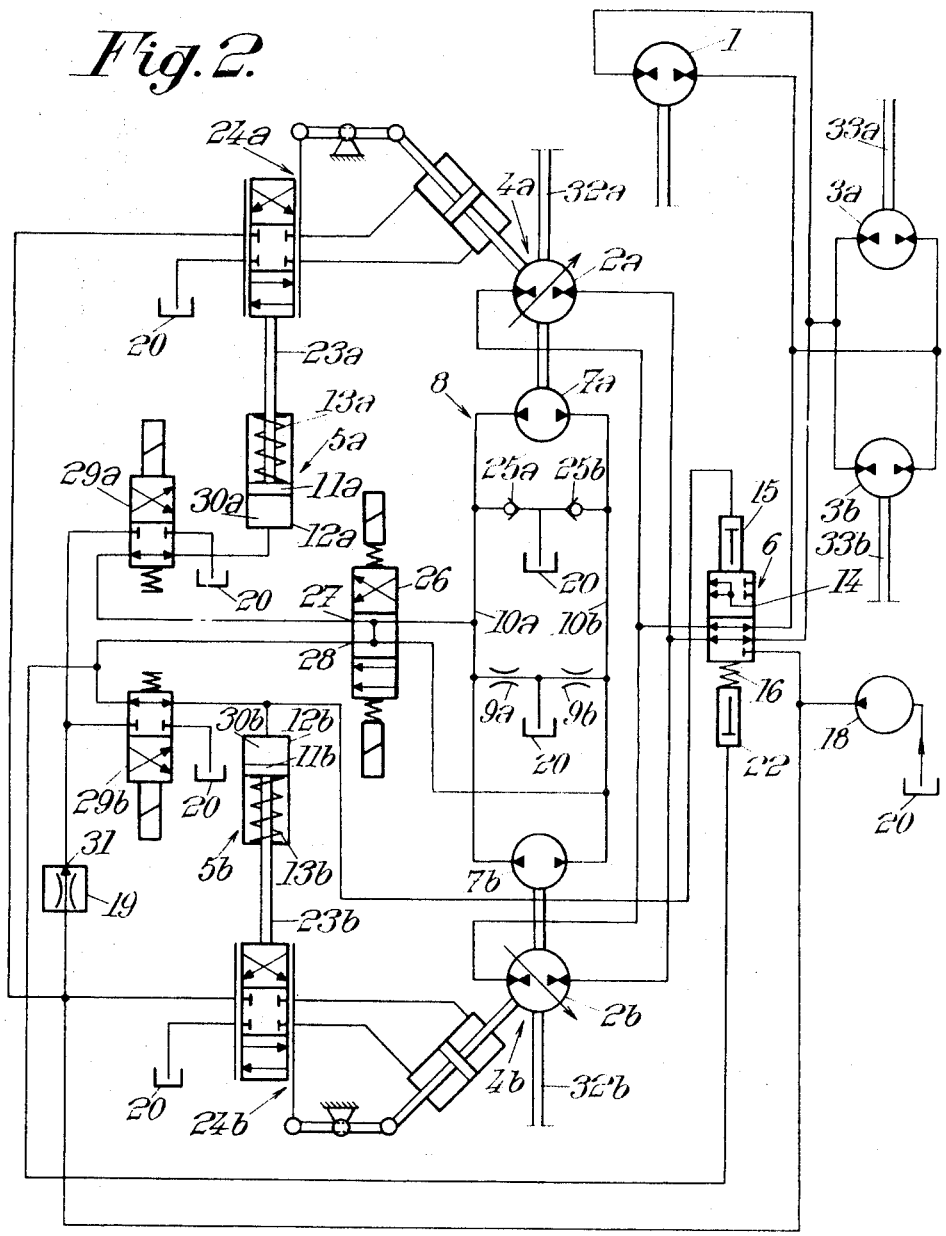

In the drawings:

FIG. 1 shows schematically a first embodiment of a hydrostatic transmission according to the invention; and FIG. 2 shows, also schematically, second and third embodiments of a hydrostatic transmission according to the invention.

This hydrostatic transmission is made up, on the whole, of an hydraulic generator or pump 1 driven by a drive motor such as an electric motor or heat engine (not shown), for example, and at least two (e.g., four) receptors or hydraulic motors 2a, 2b, 3a, and 3b fed in parallel by generator 1. Receptors 2a and 2b are interconnected, respectively, by drive shafts 32a and 32b to traction wheels arranged on opposite ends of a first axle of an automotive vehicle, and receptors 3a and 3b are interconnected, respectively, by drive shafts 33a and 33b to traction wheels arranged on opposite ends of a second axle of that automotive vehicle, the axles and wheels not having been depicted in the diagrams. Receptor 2a has associated with it an adjusting system 4a adapted to vary its output down to a null value.

That being so, in the first embodiment of the invention, for which embodiment are needed two receptors 2a and 3a capable of being fed in parallel, means are provided to cause a fluid to act at will under increasing or decreasing pressure, simultaneously upon a pressure-responsive device 5a adapted to control adjusting system 4a and upon an interruption device 6 also responsive to such pressure and adapted to isolate receptor 2a from generator 1. Pressure-responsive control device 5a, and interruption device 6 are bled of pressure so that, to the extent that the fluid pressure increases up to a certain threshold $P_s$, the pressure-responsive control device acts at first to reduce progressively down to a null value the output of receptor 2a, then interruption device 6 isolates only that receptor 2a (and vice versa). Thereupon receptor 3a, as well as receptor 3b if necessary is fed either by only a part of the output of generator 1 (receptor 2a being fed in parallel) or by the entire output thereof with receptor 2a isolated.

In the second and third embodiments (FIG. 2) according to the invention—at the same time as systems 4a and 4b for adjusting the output of receptors 2a and 2b are associated therewith—there are interconnected mechanically to receptors 2a and 2b, respectively, two pumps 7a and 7b with identical output connected in series in closed fluid circuit 8. Also, on the one hand, devices 9a and 9b are provided to bleed an excess of fluid from either of branches 10a and 10b of closed circuit 8 upon occurrence of excessive pressure therein and, on the other hand, the respective receptors are provided with correction devices responsive to pressure and adapted to control, respectively, adjusting systems 4a and 4b, the overall effect being such that when one of pumps 7a and 7b rotates more rapidly than the other the resulting excessive fluid pressure in one of branches 10a and 10b acts upon the correction device for the more rapidly rotating receptor to reduce its output.

In the embodiment shown in FIG. 1 and in which only the first feature of the invention is applied, are provided two receptors 2a and 2b, each of which has associated with it one of systems 4a and 4b adapted to cause the output thereof to vary, and pressure-responsive control devices 5a and 5b for the respective systems. Devices 5a and 5b are fed in parallel so that they act simultaneously upon the outputs of receptors 2a and 2b so as to maintain them equal. Moreover, receptors 2a and 2b form a group that can be isolated from generator 1 by a single interruption device.

Respective pressure-responsive control devices 5a, 5b are made up of pistons 11a, 11b slidably fitting in cylinders 12a, 12b and are adapted to be displaced by fluid therein counter to the bias of retraction devices 13a, 13b (such as springs, for example) in the direction corresponding to reduction in output of receptors 2a, 2b, to a limiting position for which the output is null when the fluid pressure reaches a given value $P_L$. Interruption device 6 is made up of a distributor 14 controlled by an hydraulic jack 15 and adapted to be displaced counter to the bias of an elastic device 16 (such as a spring) from a position in which receptors 2a and 2b are fed by generator 1 to a position in which receptors 2a and 2b are isolated, this last position being reached when the pressure of fluid that feeds the jack reaches a selected threshold value $P_S$ greater than given value $P_L$. Spaces 30a, 30b defined by pistons 11a, 11b in cylinders 12a, 12b are, together with jack 15 of the interruption device advantageously connected in fluid communication by a distributor 17 with either an auxiliary source 18 of fluid under pressure by way of a flow regulator 19 adapted to produce downstream the aforesaid increasing pressure or with a reservoir or tank 20 by way of a choke 21 adapted to reduce progressively the pressure previously established.

Distributor 14 is advantageously formed so that when it occupies a position in which it isolates receptors 2a and 2b from generator 1, these receptors 2a and 2b are fed in parallel by auxiliary source 18 in order that their lubrication and priming continue to be assured.

Interruption device 6 can comprise an hydraulic jack 22, which acts upon distributor 14 in the same direction as elastic device 16 and which is fed by fluid received upstream of choke 21. Pistons 11a and 11b affixed to rods 23a and 23b protruding from cylinders 12a and 12b act upon adjusting systems 4a and 4b, preferably by way of hydraulic amplifiers 24a and 24b fed by auxiliary source 18 of fluid under pressure.

It goes without saying that auxiliary fluid source 18 is selected so that the maximum pressure of fluid that it can provide is greater than threshold value $P_S$ defined above and, a fortiori, higher than given value $P_L$.

In the arrangement of FIG. 2, which illustrates two additional embodiments of the invention, components common to FIG. 1 are designated by the same reference numerals.

Devices 9a and 9b are advantageously made up of chokes, respectively connected by way of branches 10a and 10b of closed circuit 8 to reservoir 20, which has been depicted in several locations in both Figures in the interest of simplicity.

The aforementioned pressure-responsive correction devices, which are associated with respective receptors 2a and 2b, are advantageously made up of control devices 5a and 5b already described in detail with reference to FIG. 1.

A distributor 26 is provided with two or three positions according as generators 2a and 2b, and hence pumps 7a and 7b, are irreversible or reversible. Thus, fluid connection is made to the distributor outlets 27 and 28 from branches 10a and 10b of the closed circuit 8, also connected thereby to one another (in the intermediate position depicted in FIG. 2), or from respective branches 10a and 10b (when the distributor is raised to connect its lowermost part), or from respective branches 10b and 10a (in the case of a three-position distributor, when it is lowered to connect its uppermost part). Control devices 5a and 5b are provided with distributors 29a and 29b respectively having two positions in which they connect respective displacement spaces 30a and 30b either to outlets 27 and 28 of distributor 26 (outlet 31 of flow regulator 19 being then isolated) or to outlet 31 (outlets 27 and 28 then being connected to reservoir 20).

Changes in the positions of distributors 26, 29a, and 29b of FIG. 2 and of distributor 17 of FIG. 1 can be effected by suitable electrical, mechanical, pneumatic, or hydraulic means.

Branches 10a and 10b of closed circuit 8 are advantageously connected for their replenishing of reservoir 10 by way of values 25a and 25b.

In view of the foregoing, regardless of which embodiment is adopted, a hydrostatic transmission is obtained that functions as set forth below.

Reference is made, in the following, firstly to FIG. 1.

It is assumed that distributors 17 and 14 occupy at first the positions illustrated in the diagram. In this case pistons 11a and 11b are not subjected to fluid pressure, as displacement regions 30a and 30b are connected to reservoir 20 by choke 21. Adjusting systems 4a and 4b are not actuated, and the outputs of receptors 2a and 2b have their normal value. It is apparent that receptors 2a, 2b, 3a, and 3b are fed in parallel by generator 1, receptors 3a and 3b having generally nonadjustable outputs. Distributor 14 is kept in the depicted position, in which receptors 2a and 2b are joined to generator 1, by the bias of elastic device 16, hydraulic jacks 15 and 22 being connected to reservoir 20 by choke 21.

When distributor 17 is actuated to move to its other position, displacement spaces 30a and 30b and jack 15 are connected simultaneously to outlet 31 of the flow regulator 19. Displacement spaces 30a and 30b are then gradually filled with fluid emitted from auxiliary source 18 and whose flow is limited by the flow regulator 19. Piston rods 33a and 23b protrude progressively further from cylinders 12a and 12b, and the outputs of receptors 2a and 2b are reduced accordingly. For a given limiting position of pistons 11a and 11b, the pressure of fluid in displacement spaces 30a and 30b, which is determined by the characteristics of retraction devices 13a and 13b and by the flow regulator 19, reaches the value $P_L$ and the outputs of receptors 2a and 2b become null. The fluid pressure, which continues to increase in displacement spaces 30a and 30b and in jack 15, then reaches the value $P_S$, whereupon jack 15 changes the position of distributor 14 counter to the bias of elastic device 16. Distributor 14 then isolates receptors 2a and 2b from generator 1 and enables them to be fed by auxiliary source 18.

Receptors 3a and 3b which, in the case where distributor 17 occupies the position depicted in FIG. 1, receive only a part of the fluid furnished by generator 1, receive all of that fluid after the distributor has been actuated to its alternative position, whereupon they rotate at greater speed. Inasmuch as receptors 2a, 2b, 3a, and 3b drive the traction wheels of the same vehicle, it is propelled then in a higher speed range when distributor 17 is so actuated.

Conversely, after a period during which distributor 17 has kept in its second position, it can be returned to its first position, depicted in FIG. 1. Displacement spaces 30a and 30b and jack 15 are then connected by choke 21 to reservoir 20. Because of this choke the pressure prevailing in those components decreases slowly. Jack 15 at first permits distributor 14 to occupy under the bias of elastic device 16 (and jack 21 before the outlfow through the choke is complete) the position depicted in FIG. 1, wherein generator 1 is reconnected to receptors 2a and 2b, at null output. Then pistons 11a and 11b are retracted from their limiting position, thereby increasing the output of receptors 2a and 2b form their initial null value. The output of fluid reaching receptors 3a and 3b from the generator is reduced accordingly, whereupon the vehicle is propelled in a lower speed range but with a higher motor torque.

Reference will now be made to FIG. 2.

It is apparent, first of all, that when distributor 26 occupies the illustrated position, the simultaneous actuation of distributors 29a and 29b to their alternative position, whereupon displacement spaces 30a and 30b and jack 15 are connected to outlet 31 of flow regulator 19, causes gradual reduction and then complete annulment of the output of receptors 2a and 2b and finally isolation of them from generator 1. Likewise, with distributor 26 remaining in its aforesaid position, the simultaneous inactivation of distributors 29a and 29b (to the original position depicted in FIG. 2) reconnects receptors 2a and 2b at null output and then produces an increase in that output. The functioning that has been described above with regard to FIG. 1 is, thus, equally applicable to FIG. 2, with the role of choke 21 of FIG. 1 being played by chokes 9a and 9b of FIG. 2, and that of distributor 17 of FIG. 1 by the combination of distributors 29a and 29b of FIG. 2.

It is assumed now that the traction wheel (or group of wheels) driven by receptor 2a slips on the ground and rotates more rapidly than the wheel driven by receptor 2b on the same axle of the vehicle. A result of this is that pump 7a rotates more rapidly than pump 7b. There is then in branch 10b of closed circuit 8 (it being assumed that receptors 2a and 2b rotate in the direction in which that branch connects the discharge of pump 7a to the intake of pump 7b) an excess of fluid, which proceeds to reservoir 20 through choke 9b, in which it undergoes a drop in pressure. To counteract the tendency for the wheels to slip, distributor 26 is put into that one of its extreme positions which corresponds to a previously mentioned direction of rotation of receptors 2a and 2b, in which fluid under pressure in branch 10b is admitted into displacement space 30a (distributor 29a being inactivated and occupying the position indicated in FIG. 2). Then piston 11a is displaced in cylinder 12a, whereupon a reduction in output of receptor 2a is produced. This reduction in output of receptor 2a causes a reduction in the torque that it can furnish and, consequently, a reduction in its speed. Such output correction is maintained so long as pumps 7a and 7b do not rotate at the same speed.

Conversely, it is apparent that, if receptor 2b rotates more rapidly than receptor 2a, fluid resulting from excessive pressure in circuit 8 is admitted into displacement space 30b, having come from branch 10a.

When the directions of rotation of receptors 2a and 2b are reversed, it is necessary, in order to counteract slippage, to put distributor 26 in its other extreme position, wherein its outlet 27 is connected to branch 10a, and its outlet 28 to branch 10b. The functioning thus obtained is analogous to that already described.

Hydrostatic transmissions according to the present invention provide a number of advantages, among which the following can be mentioned: gradual transition from a low speed range to a high speed range, and vice versa; and the option of obtaining several speed ranges upon successively isolating several groups of receptors fed in parallel by the generator.

It goes without saying, and follows moreover from the foregoing, that the invention, as thus specifically described and illustrated, is not at all limited to these ways of practicing it, any more than to the ways considered of embodying its various parts. Modifications may be made therein, especially those in which actuation of the pressure-responsive devices and of the interruption device are servo coupled to the speed of the vehicle, while retaining the benefits and without departing from the concept of this invention, as defined in the following claims.

I claim:

1. Hydrostatic transmission comprising an hydraulic generator or pump driven by a drive motor such as an electric motor or a heat engine and at least two receptors or hydraulic motors adapted to be fed in parallel by the generator and interconnected mechanically to propulsion devices and with at least one of which is associated a system adapted to vary such receptor's output or delivery per shaft revolution to a null value, characterized by the fact that the transmission also comprises means to cause a fluid to act at will, under increasing or decreasing pressure, simultaneously upon a pressure-responsive device adapted to control the aforesaid system for adjusting the receptor output and upon an interruption device also responsive to such pressure and adapted to isolate from the generator the first receptor with which that system is associated, the aforesaid pressure-sensitive control device and the interruption device being pressure-actuated differentially so that, as the fluid pressure increases, the pressure-sensitive control device at first reduces the first receptor's output progressively down to a null value, then the interruption device isolates that receptor, whereupon the other receptor is fed either by only part of the output of the first generator so long as the first receptor is fed in parallel or by the entire output thereof when the first receptor is isolated.

2. Hydrostatic transmission, according to claim 1, wherein the receptors drive respective traction wheels carried on the opposite ends of the same axle of an automotive vehicle, characterized by the fact that the two receptors are mechanically interconnected, respectively, two auxiliary pumps of identical output connected in series in a closed fluid circuit, wherein on the one hand devices are provided to bleed off an excess of fluid from either of the branches of the closed circuit upon occurrence of excessive pressure therein, and on the other hand there are provided for the respective receptors corrective devices responsive to pressure and adapted to control, respectively, the aforementioned adjusting systems, the overall effect being such that when one of the pumps rotates more rapidly than the other the resulting excessive fluid pressure in one of the branches acts upon the corrective device for the more rapidly rotating receptor to reduce its output.

3. Hydrostatic transmission according to claim 1, characterized by the fact that the aforesaid control device is made up of a piston slidably fitting in a cylinder to provide fluid displacement spaces and adapted to be fluid displaced counter to the bias of a retraction device in a direction corresponding to reduction in output of the first generator to a limiting position in which that output is null when the fluid pressure acting upon that piston reaches a given value, and the aforesaid interruption device is made up of a distributor controlled by an hydraulic jack and adapted to be displaced counter to the bias of an elastic device from a position in which the two receptors are fed in parallel to a position in which the first receptor is isolated when the pressure of fluid that feeds the jack reaches a selected threshold higher than the aforementioned given value.

4. Hydrostatic transmission according to claim 3, characterized by the fact that the jack and the fluid displacement spaces in the cylinders are connected by another distributor either to an auxiliary source of fluid under pressure or to a reservoir by way of a choke.

5. Hydrostatic transmission according to claim 4, characterized by the fact that the aforementioned distributor is formed so that, when it occupies a position in which it isolates the first receptor, the latter is fed by the auxiliary source.

6. Hydrostatic transmission according to claim 2, characterized by the fact that the aforementioned bleed devices are made up of chokes connecting the respective branches of the closed circuit to a reservoir.

7. Hydrostatic transmission according to claim 2, characterized by the fact that the corrective devices are identical with control devices for the respective receptors.

8. In a hydrostatic transmission suitable for connecting a drive motor to traction wheels of a motor vehicle, wherein an hydraulic generator or pump feeds in parallel at least a pair of receptors or hydraulic motors, at least one of which has associated therewith pressure-responsive means for adjusting its output, the improvement comprising an auxiliary source of fluid under pressure; an interruption device interposed between the generator and a first one of the receptors and having two operative positions, means biasing the interruption device to a first position in which there is circuit continuity between the generator and the first receptor as well as between the generator and the second receptor, pressure-responsive means for shifting the interruption device to a second position in which the circuit continuity between the generator and the first receptor is broken; and a speed-control distributor having a low-speed position and a high-speed position and being movable at will from one position to the other, the distributor in the low-speed position connecting the auxiliary source to a reservoir at negligible pressure, and in the high-speed position connecting the auxiliary source to the pressure-responsive means for adjusting the first receptor's output and to the means for shifting the interruption device to its second position so that the first receptor is isolated from the generator by such shifting of the distributor after its output has been adjusted to a null value, whereupon the second receptor is driven faster by reason of receiving that part of the generator output that went to the parallel-fed first receptor in the first position of the distributor and the interruption device.

9. Hydrostatic transmission according to claim 8, including flow regulating means in the circuit from the auxiliary source to the distributor and choke means between the distributor and the reservoir, said means being effective to smooth out changes in flow and pressure of fluid to and from the pressure-responsive means, whereupon transitions between speed ranges are gradual, both when the distributor is moved to the high-speed position, thereby actuating the pressure-responsive means, and when the distributor is moved to the low-speed position, thereby releasing the pressure therefrom.

10. Hydrostatic transmission according to claim 9, including a third receptor located on the same side of the distributor as the first receptor and driven in parallel therewith, the third receptor also having associated with it pressure-responsive means for adjusting its output, and including also a fourth receptor located on the same side of the distributor as the second receptor and driven in parallel therewith.

11. Hydrostatic transmission according to claim 10, including a pair of pumps interconnected mechanically to the first and third receptors, respectively, and in a closed fluid circuit to one another, and an antislip distributor having a first position in which the respective branches of the closed circuit are connected to one another so as to equalize the pressures therein, and having a second position in which the branches are connected, respectively, to the pressure-responsive means for the first and third receptors in such a direction as to equalize the pressures in the respective branches by actuation of at least one of the pressure-responsive adjusting means, so as to adjust the outputs of the respective receptors to equalize their speeds, despite differences in the resistance to rotation thereof such as may be attributable to unequal traction of respective wheels driven thereby.

UNITED STATES PATENT OFFICE
CERTIFICATE OF CORRECTION

Patent No. 3,595,334                      Dated   July 27, 1971

Inventor(s)   Olivier ISAAC

It is certified that error appears in the above-identified patent
and that said Letters Patent are hereby corrected as shown below:

On the sheet containing the ABSTRACT, in the lefthand column, on line 1, change "Issac" to ---Isaac---.

Signed and sealed this 3rd day of October 1972.

(SEAL)
Attest:

EDWARD M.FLETCHER,JR.                    ROBERT GOTTSCHALK
Attesting Officer                        Commissioner of Patents